2,870,043

PRINTABLE POLYETHYLENE FILM

Leon E. Wolinski, Buffalo, N. Y., assignor to E. I. du Pont de Nemours and Company, Wilmington, Del., a corporation of Delaware No Drawing. Application June 3, 1954
Serial No. 434,324

2 Claims. (Cl. 117—138.8)

This invention relates to improvements in polyethylene films, sheets, rods, tubes, filaments and like structures, and, more particularly, to improvements in printable polyethylene films.

Films of polyethylene (i. e., solid ethylene polymer) are highly useful in a great variety of packaging applications, such as packaging fresh produce, frozen food, dried milk, chemicals and pharmaceuticals, textiles, etc. A description of films made from ethylene polymer is embodied in United States Patent No. 2,219,700 issued to Perrin et al. These films have excellent inherent moistureproofness, good mechanical strength, and are highly resistant to the action of many chemicals.

Within recent years, considerable research has been carried out on the preparation of modified polyethylene compositions, and the improvement of the surface of polyethylene structures which are normally extruded from a melt of the polymer. Research efforts have been concentrated particularly on expanding the versatility of polyethylene film as a packaging film. Heretofore, three of the basic deficiencies of polyethylene film have been its lack of clairity or transparency, particularly when compared with cellophane and "Saran" films, its low stiffness, and its lack of adhesiveness to other base materials in general, and particularly to dried ink impressions. In colloquial terms, a polyethylene film having a low degree of adhesiveness, particularly to dried ink impressions, is referred to as a "non-printable" film. Conversely, as a result of considerable research in improving the surface of a polyethylene film, a film of improved adhesiveness is know as a "printable" film.

Practically all known processes for improving the printability of a polyethylene film involve actual physical or chemical treatment of the film surface, that is, a superficial treatment while the film is either in molten or solid form. Many theories have been expounded as to the reasons why a particular superficial treatment improves the adhesiveness of a polyethylene film to dried ink impressions, commercially available adhesive compositions, polymeric coating compositions, fibrous materials, metals, etc. Some theories are based upon the purely chemical approach; that is, that chemcial groups are actually attached to the carbon atoms of the polyethylene structure. Other theories are based upon the concept that a physical change in the surface of the film is effected. Microscopic examination of polyethylene film surfaces treated by a number of existing techniques appears to indicate that the surface is actually roughened; i. e., mounds or hills are formed upon the film surface, with or without evidence of any chemical changes in the film. Regardless of theories, however, all of the known existing treatments for improving the printability of polyethylene film change the surface characteristics of the initial film to such an extent that the film behaves differently with respect to handling, machine runability, and heat-sealability, and additional treatment of the film is required. In particular, the treated polyethylene films must be sized with materials which decrease the tendency to accumulate static charges, improve film slip, and increase the film's resistance to matting, i. e., matting being defined as the tendency of super-imposed sheets or films to adhere together strongly when the films are pressed together (as in stacking for storage).

Considerable research has also been carried out, as mentioned hereinbefore, to improve the stiffness and clarity or degree of transparency of a polyethylene film. This may be accomplished by changes in the actual process of synthesizing an ethylene polymer, for example, by changing the conditions of polymerization, adding modifiers during polymerization, etc. On the other hand, the clarity and stiffness of the film may be increased by physical treatment of the formed film, e. g., by rolling the film between mill rolls.

In general, modifications to the surface of a polyethylene film to increase its clarity and/or printability present additional problems with respect to the application of sizing compositions for minimizing accumulation of static charges, improving film slip, and preventing or minimizing matting or blocking tendencies of the film. Heretofore, the most useful sizing compositions for application to an unmodified polyethylene film surface have been the alkyl aryl polyglycol ethers described in United States Patent No. 2,519,013 to T. F. Banigan. These compositions comprise a small quantity of an alkyl aryl polyglycol ether in water. The sizing compositions are highly efficient as anti-static and slip-promoting agents for polyethylene films such as the translucent and non-printable films available heretofore. However, with the advent of techniques developed for improving clarity and/or printability of a polyethylene film, it has been found that previously employed sizing compositions do not improve the surface characteristics to the degree desired for commercial handling in continuous bag-making machines and in other converting equipment.

An object of the present invention, therefore, is to provide improved polyethylene structures. A further object is to provide an anti-matting and slip-promoting agent for polyethylene structures. A further object of the present invention is to provide a new and improved sizing composition for printable polyethylene films. A further object is to provide a sizing composition for polyethylene films having a high degree of transparency. A still further object is to provide a printable polyethylene film having considerably reduced tendency to accumulate static charges, good film slip, and improved resistance to matting. A still further object is to provide a printable polyethylene film which may be easily handled and heat-sealed in commercial bag-making machines. Numerous other objects will be apparent from the following description of the invention.

The above objects are accomplished in accordance with the present invention which, briefly stated, comprises applying to structures of polyethylene, particularly printable films of polyethylene, a sizing composition comprising essentially a dialkyl silicone oil containing the following recurring unit structure,

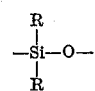

where R is an alkyl group containing from 1 to 5 carbon atoms, and having a viscosity no greater than 1,000 centistokes measured at 38° C., whereby to produce a sized polyethylene structure having enhanced slip, anti-blocking and anti-static characteristics.

The dialkyl silicone oil component of the present sizing composition is a polymer having the following recurring unit structure,

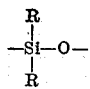

wherein R is an alkyl group containing from 1 to 5 carbon atoms. The dimethyl silicone oil is the preferred species of this invention, but higher alkyl silicone oils such as diethyl and diamyl silicone oils have been employed successfully. Dialkyl silicone oil normally comprises a mixture of various molecular weight polymer chains, and the main differences between various commercially available products are the chain length of the polymers and the degree of fractionation to which the end product has been subjected. The products may be obtained by hydrolyzing with water a dialkyl silicane or dialkyl silane dissolved in a low aliphatic alcohol. The remaining valences of the initial silicane or silane may be satisfied by such hydrolyzable radicals as the halogens, amino groups, or alkoxy radicals. For example, a dimethyl silicone oil to be employed in the present invention may be prepared by hydrolyzing a dimethyl diethoxy silicane or a dimethyl dichloro silicane. In the case of preparing the dimethyl silicone oil from a pure dimethyl diethoxy silicane, the silicane is preferably dissolved in ethyl alcohol and the hydrolysis is carried out with water. In general, the use of a catalyst for promoting hydrolysis and the use of heat during hydrolysis or during the subsequent drying of the product will increase the viscosity of the oil end product.

One technique of preparing dialkyl silicone oils, particularly dimethyl silicone oils, is described in United States Patent No. 2,452,254 to R. R. McGregor. The procedure described leads to the preparation of a mixture of linear polymeric dimethyl silicone oils. The viscosity of the resulting oil may be regulated be varying the conditions of the reaction.

The preferred dialkyl, preferably dimethyl, silicone oils for use in the present sizing compositions are described and claimed in United States Patent No. 2,469,888 to W. I. Patnode. This patent describes stabilized dialkyl silicone oils having non-reactive end groups on the polymer chains, for example, as represented by the general formula:

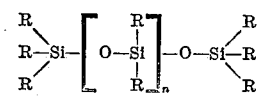

where R is an alkyl radical and $n$ is a positive integer.

The dialkyl silicone oils in the present sizing composition should have a viscosity within the range from 100 to 1000 centistokes measured at 38° C. In testing printable polyethylene films sized with the present aqueous compositions and employing dimethyl silicone oils having a viscosity substantially below 100 centistokes, it has been found that the film has acceptable slip, but that the blocking characteristics of the film are poor; that is, the film readily adheres together when subjected to the matting test to be described hereinafter. On the other hand, the use of dimethyl silicone oils having a viscosity above 1,000 centistokes leads to the preparation of a sized polyethylene film which is excessively sticky because the oil is too viscous for use in the present sizing composition.

The dialkyl silicone oils may be applied to the surfaces of the polyethylene structures, particularly film, from solutions of the oils in a solvent, such as acetone, benzene, and ethyl alcohol, or preferably from dispersions of the oils in non-solvent media, preferably water, with the aid of a water-soluble alkyl aryl polyglycol ether (described in aforementioned U. S. P. 2,519,013) of the formula: R—O—(CH$_2$CH$_2$O)$_x$—H wherein R is a benzene ring substituted at least once by a member of the group consisting of alkyl and cycloalkyl radicals having at least 4 carbon atoms, and mixtures thereof, and $x$ is an integer from 6 to 25, inclusive, which serves to wet the hydrophobic polyethylene surface and thereby ensure uniform application of the silicone oil upon the film surface. The preferred aqueous sizing baths are normally maintained at room temperature but may advantageously be maintained at somewhat higher temperatures to facilitate subsequent drying of the sized film.

The water-soluble alkyl aryl polyglycol ethers are compounds of the general formula:

$$R—O—(CH_2CH_2O)_x—H$$

as defined hereinbefore. These compounds are readily prepared by reacting ethylene oxide with an alkyl and/or cycloalkyl substituted phenolic compound in the desired molecular ratio. It is readily understood that commercially available ethers are, of course, not always pure compounds but sometimes mixtures, particularly with reference to the ethylene oxide chain length. Representative alkyl and/or cycloalkyl substituted carbocyclic hydroxyl reactants are dibutyl phenol, octyl phenol, iso-octyl phenol, dodecyl phenol, p-tertiary butyl phenol, cyclohexyl phenol, diamyl phenol, ditertiary butyl-m-cresol, ditertiary butyl-p-cresol, monotertiary butyl-m-cresol, p-tertiary hexyl phenol, ditertiary hexyl phenol, nonyl phenol, etc. It is preferred that the ether contain from 8–14, inclusive, ethylene oxide groups.

The concentration of the dialkyl silicone oil in the present aqueous sizing compositions, the oil being present in the form of a dispersion of oil in water, should be within the range from about 0.1% to about 0.5%, by weight of the total sizing composition, and preferably within the range from 0.2% to 0.25%. Normally, less than 0.1% is not sufficient to impart adequate anti-matting characteristics or satisfactory slip to the sized film. This is particularly evident in running the sized film through commercial bag-making machines at reasonable speeds, for example, at 120′ per minute or above. On the other hand, although it is normally not necessary, except with certain types of untreated, i. e., not treated to improve printability, polyethylene films, as much as 1% of the dimethyl silicone oil may be employed in the aqueous medium, but concentrations above 1% lead to depositing such excessive amounts of silicone oil upon the film surface that the heat-seal bond strengths of the film may be appreciably decreased below what is considered to be satisfactory for commercial bag-making operations. Normally, when employing the recommended concentrations of dimethyl silicone oil in the present sizing compositions, not more than about 1,500 micrograms (1.5 milligrams) of oil per square foot of film surface should be deposited upon the surface of treated films. On the other hand, in sizing certain types of untreated films (see Table V), it may be necessary to apply up to 3,000 micrograms (3.0 milligrams) of oil per square foot of film surface. Furthermore, it is preferred that at least 400 micrograms (0.4 milligrams) of the silicone oil per square foot be applied.

The aqueous sizing composition should contain from about 0.1% to about 0.5%, by weight of the total sizing composition, and preferably 0.3–0.5% of the alkyl aryl polyglycol ether. When quantities substantially higher than 0.5% are employed, the heat-seal bond strength of the sized printable polyethylene film appears to decrease; and the reduction in heat-seal bond strength decreases as more of the material is deposited upon the film surface. The use of substantially less than 0.1% of the alkyl aryl polyglycol ether in the sizing composition is inadequate to wet the hydrophobic film surface uniformly and, as a result, the dialkyl silicone oil is not deposited uniformly upon the film surface. The presence of an inadequate quantity of wetting agent in the sizing composition is readily apparent when the sized film is printed with an aniline or rotogravure printing ink employed for printing on cellophane, polyethylene film, etc.

So-called "pin holes" are formed in the inked surface which indicates that the silicone size was not uniformly deposited upon the film. These pin holes represent areas where actual droplets of the silicone size were deposited because the film surface was not uniformly wetted. As a general observation, when employing the concentrations of alkyl aryl polyglycol ether mentioned above, normal sizing operations will result in the deposition of not more than about 2.5 milligrams of the glycol ether per square foot of film surface upon the film. Generally, at least 0.8 milligram of glycol ether per square foot of film surface should be applied.

In the preparation of the emulsion or dispersion of silicone oil in water, it is necessary to prepare the emulsion with the aid of an emulsifying or dispersing agent. The alkyl aryl polyglycol ether described hereinbefore may be employed satisfactorily as both an emulsifying or dispersing agent and a wetting agent. Among other compounds which may be employed in the capacity of emulsifying or dispersing agents, there may be mentioned various compounds sold under the trade names "Tween" and "Myrj" manufactured by the Atlas Powder Company. Compounds sold under the name "Tween" are polyoxyalkylene derivatives of hexitol anhydride partial long chain fatty acid esters, e. g., polyoxyethylene derivatives of the following: sorbitan monolaurate, sorbitan monopalmitate, sorbitan monostearate, sorbitan monooleate, and sorbitan trioleate. Those sold under the "Myrj" trade name are polyoxyalkylene derivatives of fat-forming fatty acids in the form of low-melting-point, waxy materials with a considerable range of water solubility. Included among other suitable emulsifying agents which may be used are morpholine oleate and various quaternary salts, etc.

By way of example, preparation of the oil-in-water emulsions may be carried out as follows: From 0.1% to 0.6%, by weight of the dimethyl silicone oil, of an octyl phenyl polyglycol ether, prepared by reacting 9.5 mols of ethylene oxide with 1 mol of octyl phenol, is added to 40 parts of a dimethyl silicone oil having a viscosity of 300 centistokes at 38° C. The mixture is agitated to disperse the glycol ether. Sixty (60) parts of water are added with agitation. This mixture may then be employed as a "master-mix" for further dilution with water to form an aqueous sizing bath within the scope of the present invention. Normally, on standing, this master-mix will separate into an oil-in-water and a water-in-oil emulsion. Reagitation may be necessary before further dilution with water.

A portion of the above "master-mix" is then diluted with water with agitation to form oil-in-water emulsions wherein the concentration of oil is within the range of from 0.1%–0.5% by weight of the total sizing composition. To obtain the proper concentration of wetting agent in the sizing composition, an additional amount may be added to raise the concentration to within the range of 0.1% to 0.5%.

As stated above, the present dialkyl silicone oils may also be applied to the polyethylene structures from a sizing solution of the oil in a suitable solvent such as acetone, benzene, or ethyl alcohol. Normally, when applied from a solvent solution, the concentration of oil in solvent will be somewhat greater than in an aqueous medium, that is, usually at least 0.5% and no greater than 2% by weight of the total composition. No wetting agents are necessary when oils are applied from solvent solutions. Obviously, the solvent employed should exert substantially no solvent action on the polyethylene structure.

While the sizing compositions of the present invention are useful in coating either untreated or printable polyethylene structures, they are most useful when applied to so-called "treated" or "printable" polyethylene films. There are numerous ways in which the surface of a polyethylene film may be modified to improve its general adhesiveness, and in particular, its printability. For example, the film surface may be treated with chlorine gas as disclosed and claimed in United States Patent No. 2,502,481 to Henderson; or the film may be subjected to such conditions that one surface is heated and the opposite surface is maintained at a lower temperature as taught by Kreidl in United States Patent No. 2,632,921; or the polyethylene film surface may be treated with a gas flame as taught by Kritchever in United States Patent No. 2,648,097; or the polyethylene film may be treated with a sulfuric acid-dichromate solution as disclosed and claimed in Horton United States Patent No. 2,668,134. In the following examples, the polyethylene films were rendered printable in accordance with the process of copending application United States Serial No. 323,271, filed November 29, 1952, in the name of L. E. Wolinski. In this process, the freshly formed polyethylene film, at an elevated temperature above 150° C. usually at a temperature of about 250°–300° C., is treated in an atmosphere of ozone. Thereafter the molten, treated film is quenched in an aqueous bath maintained at a temperature within the range of from 40°–80° C.

Preferably, the sizing compositions of this invention are applied from a dip sizing bath. However, any suitable convenient method of application may be employed such as spraying, brushing, roller-coating, etc.

The following specific examples will further serve to illustrate the principles and practice of the present invention.

The following tests, particularly indicative of the advantages to be derived from the practice of this invention, will be referred to in the examples.

MATTING TEST

Matting is defined as the tendency of a film to adhere when two or more surfaces are pressed together. In this test, two samples of film, 5½" x 5½", are superimposed between two sheets of hard blotting paper (400 weight) in such a way that the film edges protrude on all sides of the composite. The composite is placed in a hand press and pressed together under a pressure of about 100 pounds per square inch at room temperature. Depending upon the behavior of the superimposed films upon releasing the pressure, the film is graded as follows:

GRADING

If, upon grasping the top sheet of film at one corner and pulling gently in the same plane as the film, the top sheet slides free of the bottom sheet, the film is Grade 1.

If the bottom sheet of film slides with the top sheet as the top sheet is pulled horizontally, the top sheet is then pulled up vertically slowly and smoothly. If the two sheets separate, the film is Grade 2.

If the bottom sheet adheres to the top sheet during the upward vertical pull, the sheets are lifted free of the blotting paper so that they hang vertically. If the bottom sheet then falls freely by itself or with help, e. g., by separating upper edge and upper ⅓ of the total area of the sheets, the film is Grade 3.

If the sheets still remain stuck together after following the above procedure, the film is Grade 4.

SLIP TEST

Slip is defined as the measure of the ease with which two contacting surfaces of a film slide past each other when held together under constant pressure while being subjected to a shearing action. A film having good slip means that the adjacent film surfaces easily slip past each other even when appreciable pressure is applied to the layers. There are numerous methods to evaluate film slip, all of which are indicative of the degree of slip which may be expected during handling of the film, particularly in converting machinery. Film slip as expressed in the following examples was measured in accordance with the following test: Sheets of film 3" in width and 8"–12" in length are employed in this test. Metal clamps are attached to each end of the length of film, the mouth of each clamp running widthwise of the sheet. The film having clamps at each end is draped over a stationary (non-rotatable) stainless steel roll. A string is attached to one clamp which is ½" below the roller over which the film is draped. This string is then passed under a lower rotatable roll and up over an upper rotatable roll, both rotatable rolls being parallel to the stationary roll. The film is not pulled tightly over the stationary roll. A 100 gram weight is then attached to the free end of the string; a horizontal mark is made at a point on the film; and the mark is projected onto the surface of the stationary roll. In this way, any movement of the film on the roll can be detected by noting when the marked lines no longer match up. Thereafter, additional 100 gram weights are carefully added one at a time to the load already attached to the string, and a record is made of the range of weights necessary to make the film just begin to slip on the stationary roll. For example, if no slip occurs with a load of 200 grams, and slip does occur at a load of 300 grams, the range wherein the film slips is 200–300 grams.

ELECTROSTATIC PROPENSITY

The electrostatic propensity of a film surface is a measure of the susceptibility of a film to accumulate electrostatic charges upon its surface under the influence of friction normally encountered in manipulating or working film in converting equipment. The electrostatic propensity characteristic of the film was measured as follows: A strip of film 1" x 10" in size is supported on and in electrical contact with a flat, slightly roughened, stainless steel plate which is connected to a meter for measuring electrical potential, but which is otherwise insulated from its surroundings. The plate is roughened by rubbing it lightly with #100/120 Carborundum cloth, making very slight scratches at right angles to the direction of movement of the film. A weighted, felt-covered block which has a 1" x 2" face presses the film into contact with the stainless steel plate. An electrostatic charge is generated by pulling the film for a distance of 8" while the film is maintained between the weighted block and the stainless steel plate, and the charge so generated on the film discharges onto the stainless steel plate with which it is in contact and is measured by the meter. The values registered on the meter (herein called electrostatic propensity) are purely relative and are useful only for purposes of comparison. They indicate the ability of a film to accumulate an electrostatic charge under the influence of friction normally encountered in manipulating or working with the film. The higher the electrostatic propensity value, the greater is the tendency of the film to accumulate a static charge.

*Examples 1–49, inclusive*

Tables I–V, inclusive, summarize the results of sizing polyethylene film which has been treated to convert it to a printable polyethylene film in accordance with the process disclosed in copending application U. S. Serial No. 323,271, filed November 27, 1952 in the name of L. E. Wolinski. In Examples 1–44, inclusive, the polyethylene film was extruded from a melt at a temperature of about 285° C.; and the molten freshly-formed film, while still at a temperature of about 285° C., was treated in an atmosphere comprising 3.3% of ozone, by volume, and the remainder being oxygen, at a rate of about 120' per minute. The treated film was thereafter quenched in an aqueous bath maintained at a temperature between 40° and 80° C., and the quenched film was directly immersed into a dip size tank containing an aqueous sizing composition containing the oil and wetting agent specified in Table I. The sized film was then passed vertically into a set of squeeze rolls to remove excess fluid, and the film was dried.. When the film was sized with organic solutions of the dialkyl silicone oils, the film was first dried subsequent to quenching and prior to the sizing treatment, after which it was subjected to an atmosphere at somewhat elevated temperatures to remove solvent.

TABLE I

| Example | Sizing Composition | | | Matting Test | Slip Test | Heat Seal, gms./in. | Remarks |
|---|---|---|---|---|---|---|---|
| | Wetting Agent Glycol Ether [1] (percent by weight) | Silicone Oil (percent by weight and viscosity) (cst.—centistokes) | Inert Medium | | | | |
| Control [2] | 0.5 | | 99.5—water | Greater than 1 | 200/300 | 1,280 | |
| Do | | | 100—water | 4 | 900/1,000 | 800 | |
| 1 | 0.21 | | 99.79—water | 4 | 900/1,000 | 790 | |
| 2 | 0.25 | Dimethyl oil—0.05%—300 cst | 99.70—water | 4 | 500/600 | 820 | Morpholine oleate dispersing agent. |
| 3 | 0.25 | Dimethyl oil—0.10%—300 cst | 99.65—water | 4 | 500/600 | 750 | Do. |
| 4 | 0.25 | Dimethyl oil—0.15%—300 cst | 99.60—water | 4 | 500/600 | 780 | Do. |
| 5 | 0.25 | Dimethyl oil—0.20%—300 cst | 99.55—water | 3 | 300/400 | 900 | Do. |
| 6 | 0.25 | Dimethyl oil—0.25%—300 cst | 99.50—water | 2 | 300/400 | 870 | Do. |
| 7 | 0.25 | Dimethyl oil—0.30%—300 cst | 99.45—water | 2 | 300/400 | 600 | Do. |
| 8 | 0.21 | Dimethyl oil—0.50%—300 cst | 99.29—water | 2 | 300/400 | 520 | Do. |
| 9 | 0.10 | Dimethyl oil—0.10%—300 cst | 99.80—water | 2 | 500/600 | 900 | Do. |
| 10 | 0.10 | Dimethyl oil—0.15%—300 cst | 99.75—water | Greater than 3 | 300/400 | 830 | |
| 11 | 0.20 | Dimethyl oil—0.2%—300 cst | 99.60—water | Greater than 2 | 300/400 | 860 | |
| 12 | 0.30 | Dimethyl oil—0.2%—300 cst | 99.50—water | do | 300/400 | 850 | |
| 13 | 0.40 | Dimethyl oil—0.2%—300 cst | 99.40—water | do | 300/400 | 540 | |
| 14 | | Diethyl oil, 10% | 90 isopropyl ether | 1 | 300/400 | | |
| 15 | | Diethyl oil, 5% | 95 isopropyl ether | 1 | 300/400 | | |
| 16 | | Diethyl oil, 2% | 98 isopropyl ether | 1 | 300/400 | | |
| 17 | | Diethyl oil, 1% | 99 isopropyl ether | 1 | 300/400 | | |
| 18 | | Diethyl oil, 0.5% | 99.5 isopropyl ether | 2 | 500/600 | | |
| 19 | | Diethyl oil, 0.25% | 99.75 isopropyl ether | 3 | 800/900 | | |
| 20 | 0.20 | Diethyl oil, 0.2% | 99.60—water | 4 | 800/900 | | |
| 21 | 0.20 | Diethyl oil, 0.4% | 99.40—water | 4 | 800/900 | | |
| 22 | 0.20 | Diethyl oil, 0.5% | 99.30—water | 4 | 800/900 | | |
| 23 | 0.20 | Diethyl oil, 0.6% | 99.20—water | 3 | 700/800 | | |
| 24 | 0.20 | Diethyl oil, 0.8% | 99.00—water | 3 | 700/800 | | |
| 25 | | Diamyl oil, 5% | 95 mineral spirits | 4 | 900/1,000 | | |
| 26 | | Diamyl oil, 2% | 98 mineral spirits | 3 | 900/1,000 | | |
| 27 | | Diamyl oil, 1% | 99 mineral spirits | 3 | 800/900 | | |
| 28 | | Diamyl oil, 0.5% | 99.5 mineral spirits | Greater than 3 | 700/800 | | |
| 29 | | Diamyl oil, 0.25% | 99.75 mineral spirits | 4 | 900/1,000 | | |

[1] Octyl phenyl polyglycol ether prepared by reacting 9.5 mols ethylene oxide with 1 mol of octyl phenol.
[2] Untreated film; i. e., non-printable film.

To test heat-seal strength, sheets of film 5½" x 5½" were cut from continuous rolls of film. Two sheets of the film were superimposed so that a treated, e. g., ozone treated, and an untreated side were adjacent. The heat seal, which was 4" in length and ⅛" in width, was made in the machine direction of the film, that is, the direction in which the film was extruded from a slot orifice. The heat seal was made at 200° C. at 50 p. s. i. and 0.15 second dwell. The sheets were then cut into ½" strips (the length of the strips running perpendicular to the heat seals). The strips were then pulled in a Suter tester, and the strength of the seal is reported in grams/inch.

Table I illustrates the use of dimethyl, diethyl and diamyl silicone oils. Table II shows the results of varying the concentrations of silicone oils and wetting agent. Table III illustrates the effects upon slip and blocking of variations in the viscosity of the silicone oils. Table IV illustrates the results of sizing polyethylene films extruded as hereinabove described, but treated (for improving printability) by processes other than with ozone. Table V illustrates the results of sizing polyethylene untreated films extruded from modified polyethylene flakes which produce films of considerably increased transparency and stiffness.

TABLE II

| Example | Sizing Composition | | | Matting Test | Slip Test | Heat Seal, gms./in. | Remarks |
|---|---|---|---|---|---|---|---|
| | Wetting Agent Glycol Ether [1] (percent by weight) | Silicone Oil (percent by weight and viscosity) (cst.—centistokes) | Inert Medium | | | | |
| 30 | 0.15 | Dimethyl oil—0.05%—300 cst | 99.8—water | 4 | 900/1,000 | 790 | Too low silicone oil. |
| 31 | 0.10 | Dimethyl oil—0.10%—300 cst | do | 2 | 500/600 | 900 | O. K. |
| 32 | 0.05 | Dimethyl oil—0.10%—300 cst | 99.85 water | 4 | 800/900 | 780 | Too low glycol ether "Pinholing" ink. |
| 33 | 0.05 | Dimethyl oil—0.25%—300 cst | 99.70—water | 4 | 800/900 | 790 | Do. |
| 34 | 0.65 | Dimethyl oil—0.60%—300 cst | 98.75—water | 2 | 300/400 | 340 | Too high silicone and glycol ether-reduced heat-seal strength. |
| 35 | 0.60 | Dimethyl oil—0.25%—300 cst | 99.15—water | 2 | 300/400 | 480 | Too high glycol ether, low heat-seal. |
| 36 | 0.25 | Dimethyl oil—0.75%—300 cst | 99.00—water | 3 | 300/400 | 420 | Too high silicone oil, low heat-seal. |
| 37 | 0.21 | Dimethyl oil—0.50%—300 cst | 99.29—water | 2 | 300/400 | 520 | Borderline silicone. |
| 38 | 0.25 | Dimethyl oil—0.25%—300 cst | 99.50—water | 2 | 300/400 | 870 | O. K. |

[1] Octyl phenyl polyglycol ether prepared by reacting 9.5 mols ethylene oxide with 1 mol of octyl phenol.

TABLE III

| Example | Sizing Composition | | | Matting Test | Slip Test | Heat Seal, gms./in. | Remarks |
|---|---|---|---|---|---|---|---|
| | Wetting Agent Glycol Ether [1] (percent by weight) | Silicone Oil (percent by weight and viscosity) (cst.—centistokes) | Inert Medium | | | | |
| 39 | 0.25 | Dimethyl oil—0.25%—40 cst | 99.50—water | 4 | 900/1,000 | 780 | Viscosity too low. |
| 40 | 0.25 | Dimethyl oil—0.25%—100 cst | do | 3 | 800/900 | 800 | Viscosity O. K.—borderline. |
| 41 | 0.25 | Dimethyl oil—0.25%—300 cst | do | 2 | 300/400 | 800 | Viscosity O. K. |
| 42 | 0.25 | Dimethyl oil—0.25%—350 cst | do | 2 | 300/400 | 820 | Do. |
| 43 | 0.25 | Dimethyl oil—0.25%—1,000 cst | do | Less than 4 | 800/900 | 560 | Viscosity O. K.—borderline. |
| 44 | 0.25 | Dimethyl oil—0.25%—3,000 cst | do | 4 | 900/1,000 | 320 | Viscosity too high. |

[1] Octyl phenyl polyglycol ether prepared by reacting 9.5 mols ethylene oxide with 1 mol of octyl phenol.

TABLE IV

| Example | Treatment to Improve Printability | Sizing Composition | | | Matting Test | Slip Test | Heat Seal, gms./in. |
|---|---|---|---|---|---|---|---|
| | | Wetting Agent Glycol Ether [1] (percent by weight) | Silicone Oil (percent by weight and viscosity) (cst.—centistokes) | Inert Medium | | | |
| 45 [2] | Flame treated | 0.25 | Dimethyl oil—0.25%—300 cst | 99.50—water | 2 | 300/400 | 800 |
| 46 [3] | Treated with a discharge. | 0.25 | do | do | 2 | 300/400 | 760 |

[1] Octyl phenyl polyglycol ether prepared by reacting 9.5 mols ethylene oxide with 1 mol of octyl phenol.
[2] Film flame treated to improve printability.
[3] Film treated with corona discharge to improve printability.

TABLE V

| Example | Sizing Composition | | | Matting Test | Slip Test | Heat Seal, gms./in. |
|---|---|---|---|---|---|---|
| | Wetting Agent Glycol Ether [1] (percent by weight) | Silicone Oil (percent by weight and viscosity) (cst.—centistokes) | Inert Medium | | | |
| Control | | | | Greater than 4 | 1,500/1,600 | |
| 47 | 0.40 | Dimethyl Oil—0.25%—350 cst | 99.35—water | 2 | 500/600 | 1,080 |
| 48 | 0.40 | Dimethyl Oil—0.50%—350 cst | 99.10—water | 2 | 400/500 | 1,060 |
| 49 | 0.40 | Dimethyl Oil—0.75%—350 cst | 98.85—water | 2 | 400/500 | 1,060 |

[1] Octyl phenyl polyglycol ether prepared by reacting 9.5 mols ethylene oxide with 1 mol of octyl phenol.

*Examples 50–53, inclusive*

The following table, Table VI, summarizes the effect of the present aqueous sizing compositions upon the electrostatic propensity of the treated or printable polyethylene films. In general, the present sizing composition appreciably decreases the accumulation or development of static charges upon the surface of the treated polyethylene film.

TABLE VI

| Example | Film | Electrostatic Propensity (Volts) |
|---|---|---|
| Control | Polyethylene film, untreated and unsized. | 290. |
| 50 | Polyethylene film, untreated and sized with an octyl phenyl polyglycol ether (0.4%, by weight in water) in accordance with teachings of U. S. P. 2,519,013 to T. F. Banigan. | less than 100. |
| 51 | Polyethylene film, treated with ozone but unsized. | 510. |
| 52 | Polyethylene film, treated with ozone and sized with an octyl phenyl polyglycol ether (0.4%, by weight, in water). | 460. |
| 53 | Polyethylene film, treated with ozone and sized with aqueous composition comprising 0.15% of octyl phenyl polyglycol ether and 0.25% of a dimethyl silicone oil having a viscosity of 350 centistokes at 38° C. (General Electric silicone oil SF-96). | less than 100. |

As shown in Table VI, the accumulation of static charges upon the polyethylene film, sized with the composition of the present invention, is appreciably reduced in comparison with the untreated, unsized film or ozone-treated film. The electrostatic propensity may be further reduced by adding a small amount, from about 0.03% to about 0.1%, by weight of the total sizing composition, of zinc chloride to the sizing compositions of this invention, the range of concentrations being particularly applicable to the aqueous sizing compositions.

I claim:
1. Polyethylene film the surfaces of which have uniformly distributed thereon a composition comprising essentially from 0.4 to 3.0 milligrams, per square foot of film surface, of dimethyl silicone oil having a viscosity no greater than 1000 centistokes measured at 38° C., and from 0.8 to 2.5 milligrams, per square foot of film surface, of a water-soluble alkyl aryl polyglycol ether of the formula:

$$R—O—(CH_2CH_2O)_x—H$$

wherein R is a benzene ring substituted at least once by a member of the group consisting of alkyl and cycloalkyl radicals having at least 4 carbon atoms and mixtures thereof, and $x$ is an integer from 6 to 25 inclusive.

2. Printable polyethylene film the surfaces of which have uniformly distributed thereon a composition comprising essentially from 0.4 to 1.5 milligrams, per square foot of film surface, of dimethyl silicone oil having a viscosity no greater than 1000 centistokes measured at 38° C., and from 0.8 to 2.5 milligrams, per square foot of film surface, of a water-soluble alkyl aryl polyglycol ether of the formula:

$$R—O—(CH_2CH_2O)_x—H$$

wherein R is a benzene ring substituted at least once by a member of the group consisting of alkyl and cycloalkyl radicals having at least 4 carbon atoms and mixtures thereof, and $x$ is an integer from 6 to 25 inclusive.

References Cited in the file of this patent

UNITED STATES PATENTS

| | | |
|---|---|---|
| 2,277,048 | Leatherman | Mar. 24, 1942 |
| 2,387,157 | Koppenhoefer | Oct. 16, 1945 |
| 2,404,426 | Bechtold | July 23, 1946 |
| 2,470,772 | Haas | May 24, 1949 |
| 2,519,013 | Banigan | Aug. 15, 1950 |
| 2,523,281 | Currie | Sept. 26, 1950 |
| 2,547,694 | Dosmann | Apr. 3, 1951 |
| 2,550,211 | Watters | Apr. 24, 1951 |
| 2,588,366 | Dennett | Mar. 11, 1952 |
| 2,666,685 | Hommel | Jan. 19, 1954 |
| 2,676,120 | Banigan | Apr. 20, 1954 |
| 2,678,285 | Browning | May 11, 1954 |
| 2,717,842 | Vitalis | Sept. 13, 1955 |

OTHER REFERENCES

Dow Corning, Silicone Note Book, No. 3, September 1948, pages 1–11 and 23.

UNITED STATES PATENT OFFICE

CERTIFICATE OF CORRECTION

Patent No. 2,870,043                                                   January 20, 1959

Leon E. Wolinski

It is hereby certified that error appears in the printed specification of the above numbered patent requiring correction and that the said Letters Patent should read as corrected below.

Column 3, line 38, for "regulated be" read -- regulated by --; column 8, line 26, for "atmospere" read -- atmosphere --; columns 7 and 8, Table I, seventh column thereof, under the heading "Heat Seal, gms./in.", line 3, for "790" read -- 780 --.

Signed and sealed this 4th day of August 1959.

(SEAL)
Attest:

KARL H. AXLINE                                          ROBERT C. WATSON
Attesting Officer                                       Commissioner of Patents